(12) United States Patent
Joshi et al.

(10) Patent No.: US 8,223,187 B2
(45) Date of Patent: Jul. 17, 2012

(54) NON-BANDWIDTH INTENSIVE METHOD FOR PROVIDING MULTIPLE LEVELS OF CENSORING IN AN A/V STREAM

(75) Inventors: Neil Joshi, Milpitas, CA (US); Michael Rexroad, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 864 days.

(21) Appl. No.: 12/175,009

(22) Filed: Jul. 17, 2008

(65) Prior Publication Data

US 2010/0017818 A1 Jan. 21, 2010

(51) Int. Cl.
*H04N 7/14* (2006.01)
(52) U.S. Cl. ............... 348/14.01; 348/14.08; 348/14.12
(58) Field of Classification Search ............... 348/14.01, 348/14.02, 14.08, 14.09, 14.12–14.15; 709/204; 725/25; 370/259, 260
See application file for complete search history.

(56) References Cited

U.S. PATENT DOCUMENTS

| | | | |
|---|---|---|---|
| 8,086,076 B2 | 12/2011 | Tian et al. | |
| 2003/0193559 A1* | 10/2003 | Fernandez et al. | 348/14.08 |
| 2004/0012613 A1* | 1/2004 | Rast | 345/632 |
| 2005/0060740 A1* | 3/2005 | Stecyk | 725/28 |

OTHER PUBLICATIONS

Olaizola, Igor G., et al., "MHP Oriented Interactive Augmented Reality System for Sports Broadcasting Environments", Journal of Virtual Reality and Broadcasting, vol. 3 (2006) No. 13, obtained at http://www.jvrb.org/3.2006/euroitv2006/786/, 11 pages.
Brickley, Dan, et al., "Semantic Webapps? Lightweight RDF interfaces for SVG", obtained at http://www.w3.org/2001/sw/Europe/200407/svgwebapps/, 5 pages.
Klingemann, Mario, "Superfast Blur," Quasimondo: Incubator: Processing: Superfast Blur Blog; [Retrieved and printed Dec. 26, 2011] http://incubator.quasimondo.com/processing/superfast_blur.pdf; 1 page.

* cited by examiner

*Primary Examiner* — Tuan Nguyen
(74) *Attorney, Agent, or Firm* — Patent Capital Group (57) ABSTRACT

Particular embodiments generally relate to providing different censoring levels for audio-video streams. In one embodiment, an audio-video stream is received. Metadata including censoring information for the audio-video stream is also received. The audio-video stream and metadata may be sent by a source in separate streams. A first level of censoring associated with a first receiver is determined along with a second level of censoring for a second receiver. A first audio-video stream is generated for the first receiver with a first censor level and a second audio-video stream is generated for the second receiver with a second censor level. For example, the first audio-video stream may include censoring of faces and the second audio-video stream may be an audio-video stream without censoring or may censor some other part of the audio-video. The first audio-video stream and the second audio-video stream are then sent to the first and second receivers, respectively.

20 Claims, 5 Drawing Sheets

Figure 1:
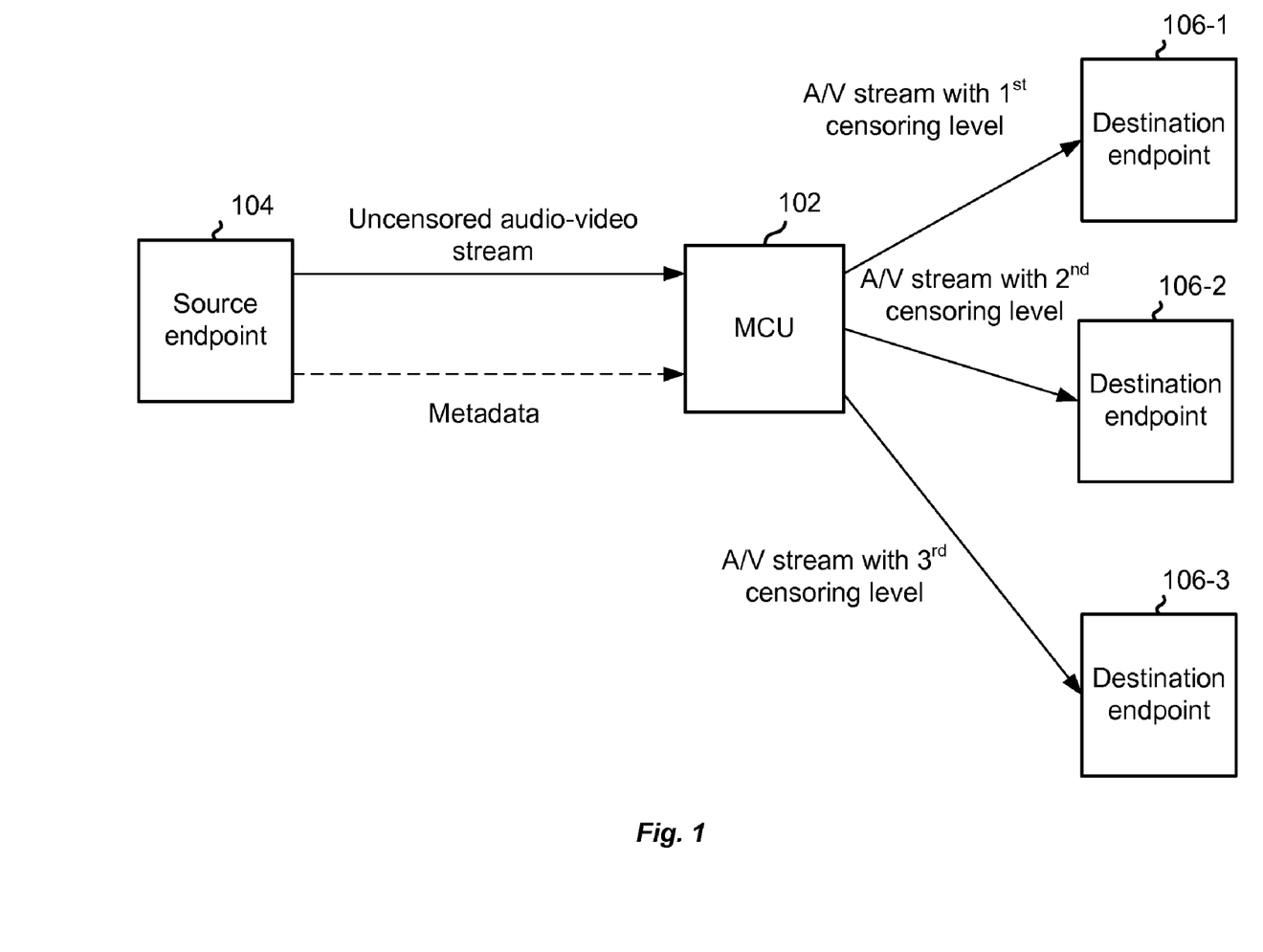
FIG. 1 depicts a simplified system for providing audio-video streams according to one embodiment.

Fig. 5 ued but are not shown. For example, audio-video may be sent over networks including wireless or wired networks. Also, various routers, switches, and conference equipment may also be included to provide the audio-video conference.

NON-BANDWIDTH INTENSIVE METHOD FOR PROVIDING MULTIPLE LEVELS OF CENSORING IN AN A/V STREAM

TECHNICAL FIELD

Particular embodiments generally relate to networking.

BACKGROUND

In audio-video conferencing, a source may send audio-video that is destined for multiple receivers. If censoring is required by some receivers but not others, the source has to send different audio-video streams to different receivers. For example, different receivers may require different levels of censoring, such as one receiver may require the blurring of faces and another receiver may require the original (i.e., non-censored) audio-video stream. Thus, a source has to send a censored audio-video stream along with a non-censored audio-video stream. Sending the censored and non-censored audio-video streams from the source uses valuable bandwidth, which may also affect the quality of the conference being provided.

DETAILED DESCRIPTION OF EMBODIMENTS

Overview

Particular embodiments generally relate to providing different censoring levels for audio-video streams. In one embodiment, an audio-video stream is received. Metadata including censoring information for the audio-video stream is also received. The audio-video stream and metadata may be sent by a source in separate streams. A first level of censoring associated with a first receiver is determined along with a second level of censoring for a second receiver. A first audio-video stream is generated for the first receiver with a first censoring level and a second audio-video stream is generated for the second receiver with a second censoring level. For example, the first audio-video stream may include censoring of faces and the second audio-video stream may be an audio-video stream without censoring or may censor some other part of the audio-video, such as the audio. The first audio-video stream and the second audio-video stream are then sent to the first and second receivers, respectively.

Example Embodiments

FIG. 1 depicts a simplified system for providing audio-video streams according to one embodiment. A multi-point control unit (MCU) 102, a source endpoint 104, and destination endpoints 106 are provided. It will be understood that other components that can be provided in a network may be Source endpoint 104 and destination endpoints 106 may be endpoints that can send and receive audio-video. For example, source endpoints and destination endpoints may be conference managers used in an audio-video conference. In one embodiment, source endpoint 104 may include capture devices, such as cameras and microphones, that capture audio-video of a conference, such as audio and/or video of users participating in the conference. That audio and/or video may be sent to destination endpoints 106. Destination endpoints 106 are then configured to render the audio and/or video.

Multi-point control unit 102 is configured to receive audio-video from source endpoint 104 and switch it to different destination endpoints 106. For example, audio-video may be received from a number of endpoints, switched, and sent to other endpoints. Although the disclosure discusses a single source endpoint 104 and multiple destination endpoints 106, it will be understood that each endpoint may include both functions (source and destination functions). Additionally, multi-point control unit 102 may be receiving multiple audio-video streams from any source or destination endpoint to provide switching in the conference.

Source endpoint 104 provides an audio-video stream to MCU 102. The audio-video stream may be a standard, uncensored audio-video stream. It should be noted that if multiple segments are being captured, such as in a three-screen display conference, three audio-video streams may be sent. That is, video for three different angles of a conference may be captured using three cameras. Also, audio may be captured, which may be the same for all three angles or may be captured from different microphones. When an audio-video stream is described, it will be understood that this may mean a video stream only, an audio stream only, or an audio and video stream. The audio and video stream may be two separate streams but the audio is associated with the video (i.e., it is time synced with the video).

The audio-video stream may include a stream of packets that carries content captured. Any protocol may be used to send the content. For example, the Real-time Transport Protocol (or RTP) defines a standardized packet format for delivering audio and video over the Internet.

Metadata for the audio-video stream may also be sent where the metadata is used for censoring the audio-video content. The metadata may be of a streaming nature that includes time stamps as to when it should be applied to the audio-video stream. Examples of metadata include coordinates of bounding boxes and image frames to be blurred or time-stamp flags indicating when to distort audio. If three audio-video streams are being sent, three different metadata streams may also be sent for the audio-video streams (or a single metadata stream may be sent that includes metadata for the three audio-video streams).

The metadata indicating when and what to censor is transmitted alongside the audio-video streams from source endpoint 104 when media is transmitted. The metadata can be transmitted on a per segment basis for each audio-video stream sent. For a triple screen endpoint, there would be three metadata streams being transmitted. Each metadata stream contains censoring information for a single audio-video stream.

Multi-point control unit 102 is configured to receive the audio-video stream and the metadata stream and can provide different levels of censoring for destination endpoints 106.

Each destination endpoint 106 may have a different censoring level associated with it. For example, a policy may provide different censoring levels. In one example, a destination endpoint 106-1 may be set to receive face-blurring censoring and unscrambled audio. In this case, the video stream received may be processed to provide censoring using the metadata provided. The metadata may include bounding box coordinates that indicate which areas of the video should be censored. Also, destination endpoint 106-2 may be set to receive scrambled audio. In this case, the metadata may be used to determine a time to scramble the audio. Further, destination endpoint 106-3 may be set to receive standard audio-video, that is, uncensored audio-video. Multi-point control unit 102 generates these audio-video streams with different censoring levels and sends them to the various destination endpoints 106.

Accordingly, particular embodiments provide different levels of censoring. A standard audio-video stream is sent from source endpoint 104 along with the metadata. This allows a single audio-video stream to be sent from source endpoint 104 to multi-point control unit 102. This saves bandwidth in that source endpoint 104 does not need to send multiple audio-video streams with different censoring levels. The metadata is then used by multi-point control unit 102 to censor the audio-video and to send different audio-video streams to destination endpoints 106.

Because multi-point control unit 102 has to send audio-video streams individually to each destination endpoint 106 even if no censoring at all is provided, additional bandwidth is not being used by providing different censoring levels. However, if multiple audio-video streams with different censoring levels are sent from source endpoint 104 to multi-point control unit 102, additional bandwidth is being used because if no censoring is being performed, only one audio-video stream needs to be sent from source endpoint 104 to multi-point control unit 102. Accordingly, particular embodiments provide different levels of censoring with minimal impact to bandwidth by allowing source endpoint 104 to send an uncensored audio-video stream with a metadata stream, which uses less bandwidth than sending another audio-video stream.

Also, providing the censoring processing in multi-point control unit 102 leverages CPU processing in the multi-point control unit that may be more powerful than that which is included in source endpoint 104. For example, multi-point control unit 102 or a proxy may include accelerated hardware that is dedicated to decoding, censoring, and encoding with low latency. A source endpoint may not include this hardware. Thus, it is desirable to offload the censoring to multi-point control unit 102. Also, additional hardware on an endpoint is not needed to provide different censoring levels.

Figure 2:
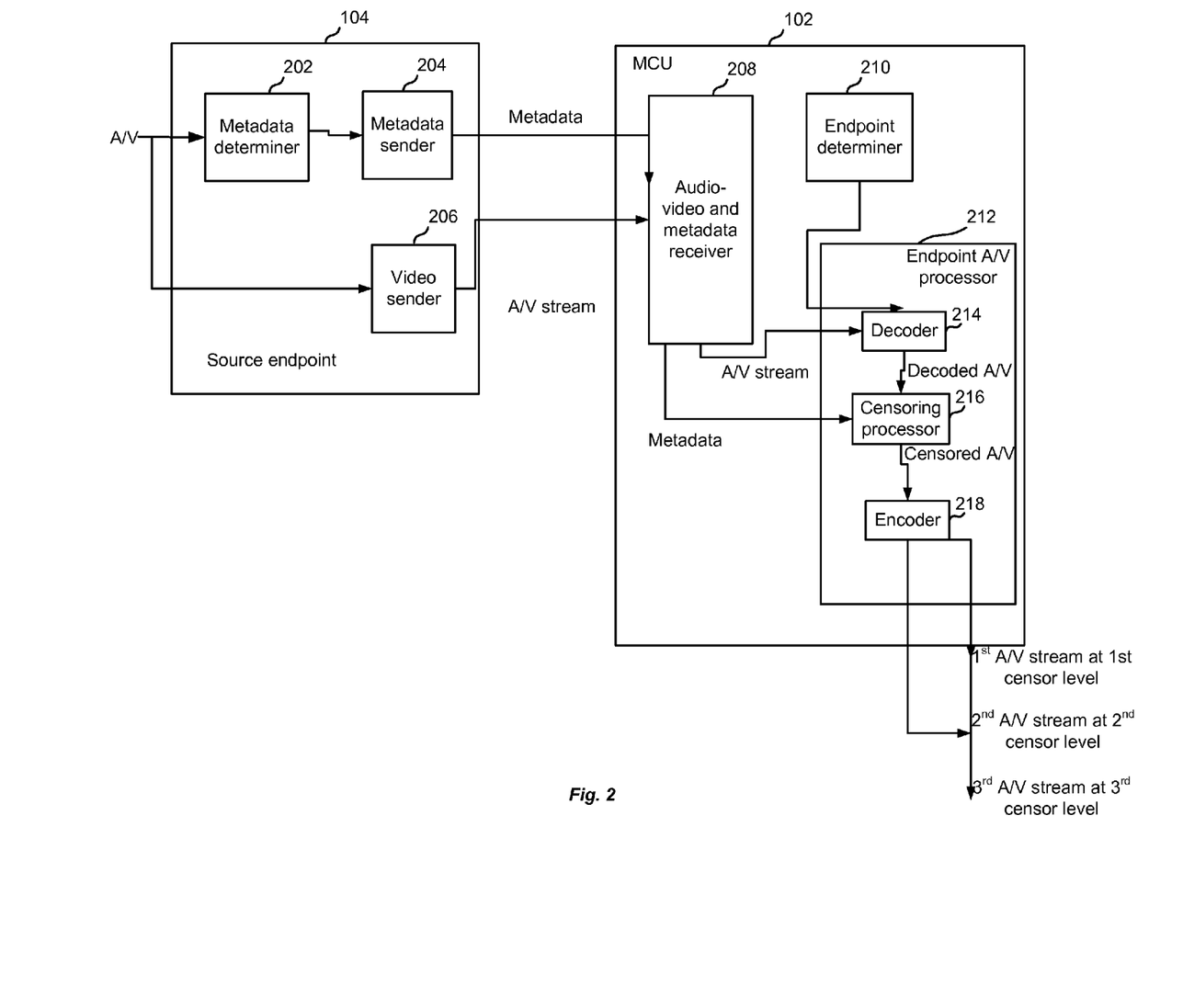
FIG. 2 depicts a more detailed example of a source endpoint and a multi-point control unit according to one embodiment.

FIG. 2 depicts a more detailed example of source endpoint 104 and multi-point control unit 102 according to one embodiment. Source endpoint 104 receives audio-video at a metadata determiner 202. Metadata determiner 202 may analyze the audio-video to determine censoring information. For example, face detection may be performed to detect bounding boxes of faces found in the video. Also, the audio stream may be analyzed to determine when audio should be distorted. Other methods of determining censoring information may also be used.

A metadata sender 204 is configured to generate a message that can be sent to multi-point control unit 102. In one example, a metadata message is transmitted via real-time transfer control protocol (RTCP) application messages. The messages may include a list that is in the following structure: {<RTP time-stamp from audio-video stream >, <error flags>, <upper left x, upper left y, lower left x, lower right y>, < . . . >, . . . }. In essence, each packet includes a time-stamp to match the respective audio-video stream, error flags in cases where the metadata determination process has failed or errors have occurred (e.g., face detection failed), and a list of bounding boxes to be blurred.

The time stamp is a time referring to when audio-video content should be censored. The bounding box coordinates are coordinates that define a blurring area. Method other than using coordinates may be used to identify a blurring area. The error flags indicate whether any errors may have occurred during the metadata generation process. It should be noted that other censoring information may be provided, such as a time-stamp to distort audio instead of the bounding box coordinates.

Additionally, different bounding boxes may block one person but not another on the same screen. However, in some cases, all persons may be blocked if blurring of faces is desired. Also, if a triple screen endpoint is being used, it is possible to block one segment (i.e., one camera angle) and not the other. Also, the censoring may be applied to an entire endpoint regardless of the number of segments (all faces are blocked from an endpoint).

In addition to sending metadata, an audio-video sender 206 sends the audio-video information to multi-point control unit 102. Thus, as discussed above, an audio-video stream is sent along with a metadata stream. In one embodiment, the metadata may be included with the audio-video stream, such as in a header or embedded within the transport stream.

The metadata stream and audio-video stream is received at audio-video and metadata receiver 208. Receiver 208 determines which destination endpoints 106 audio-video needs to be sent.

An endpoint audio-video processor 212 is configured to process the audio-video stream using censoring information in the metadata. An endpoint policy determiner 210 determines different policies for various destination endpoints 106. Based on the policy, a different censoring level is provided for destination endpoints 106.

Before censoring can be applied, the video may need to be decoded. A decoder 214 is configured to decode the audio-video. For example, the audio-video may have been compressed by source 104 and sent over a network. The compressed audio-video is decoded. The audio-video is decoded because censoring needs to be applied to the decoded audio-video.

A censor processor 216 is configured to censor the audio-video. For example, an overlay is generated and applied to the decoded audio-video stream based on the coordinates found in the metadata. Based on the metadata information, a bounding box is determined and an overlay is generated in the video stream. This overlay blurs the faces that were detected based on the coordinates provided. In another example, a time-stamp may be determined and the audio stream is distorted during the time specified.

An encoder 218 is configured to encode the audio-video with the censoring information in it. The encoded audio-video may then be sent to destination endpoint 106. As shown, three different audio-video streams may be sent with different censoring levels to destination endpoints 106.

Figure 3:
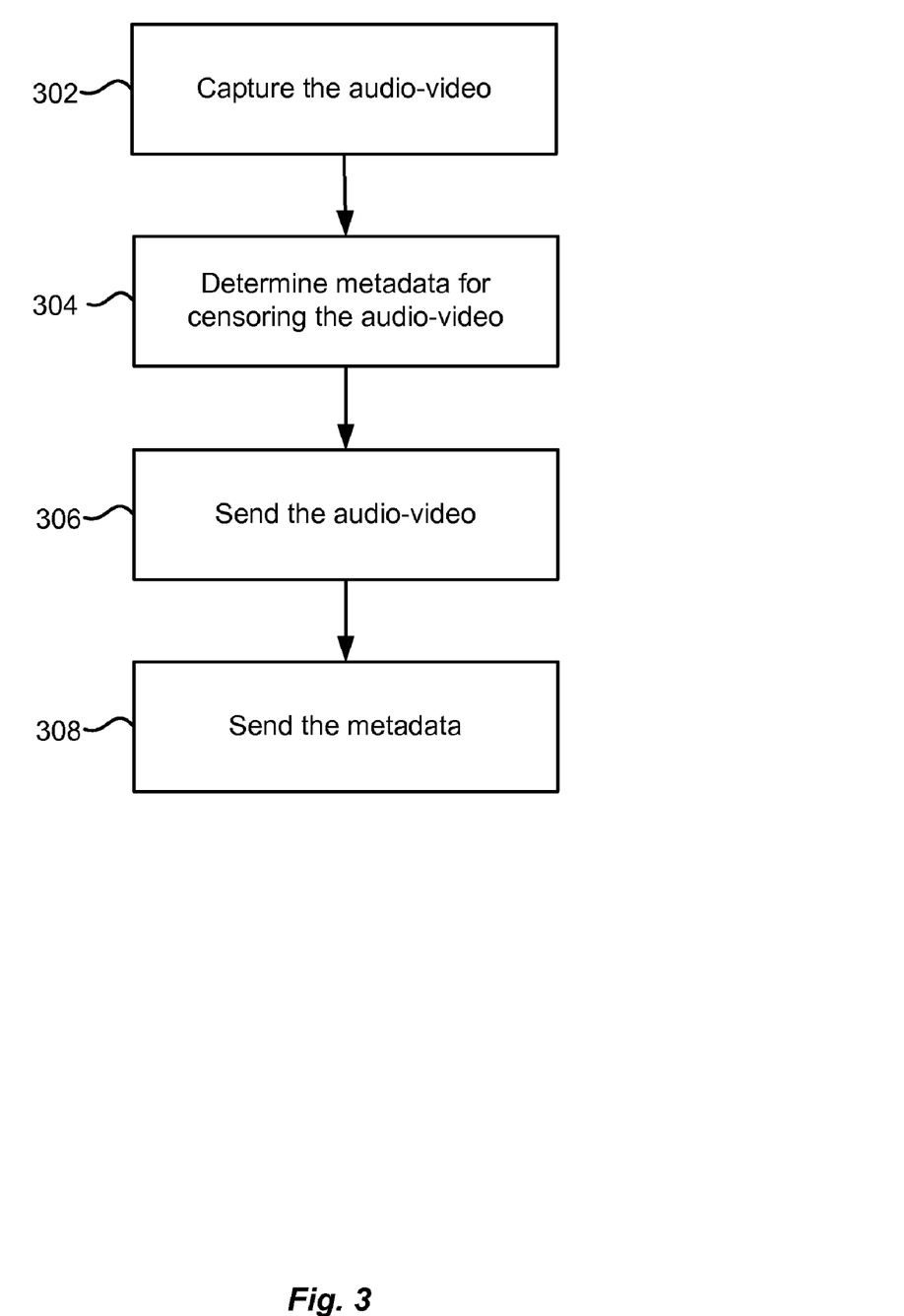
FIG. 3 depicts a simplified flowchart for sending audio-video and metadata from source endpoint.

FIG. 3 depicts a simplified flowchart for sending audio-video and metadata from source endpoint 104. Step 302 captures the audio-video. For example, in a three-screen endpoint, three different video streams may be captured. Also, a single audio stream or multiple audio streams may be captured.

Step 304 determines metadata for censoring the audio-video. For example, face detection may be performed to determine bounding box coordinates for user's faces. The metadata may be determined for each audio-video stream.

Step 306 sends the audio-video. For example, audio-video may be encoded and sent to multi-point control unit 102.

Step 308 sends the metadata. For example, for each audio-video stream, metadata stream may be transmitted.

Figure 4:
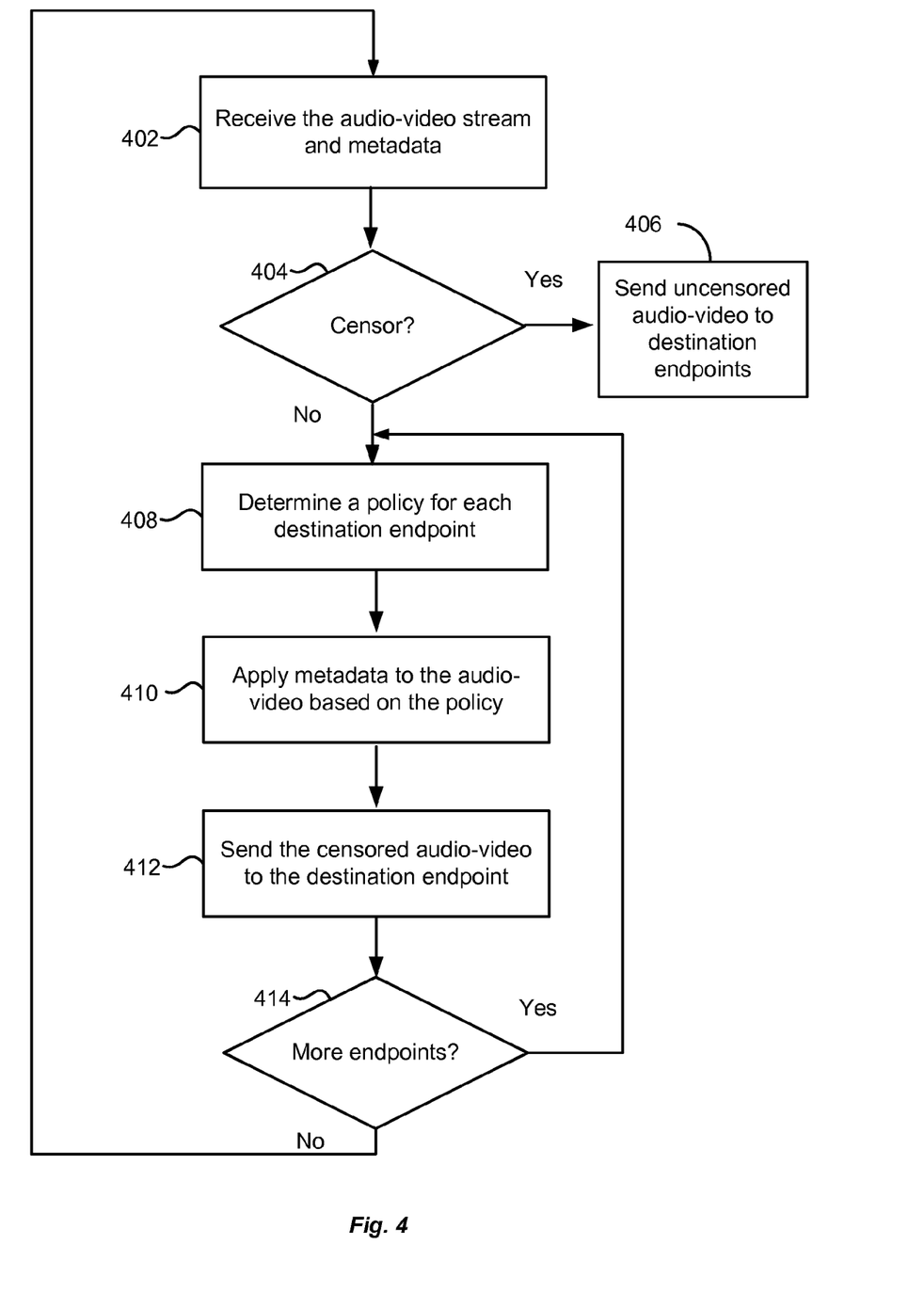
FIG. 4 depicts a simplified flowchart of a method for processing the audio-video stream and metadata at multi-point control unit according to one embodiment.

FIG. 4 depicts a simplified flowchart of a method for processing the audio-video stream and metadata at multi-point control unit 102 according to one embodiment. Step 402 receives the audio-video stream and metadata.

Step 404 determines if the audio-video should be censored. If the audio-video does not need to be censored, step 406 sends uncensored audio-video to destination endpoints 106.

In some cases, destination endpoints 106 may require censoring. Accordingly, step 408 determines a policy for each destination endpoint 106.

Step 410 applies metadata to the audio-video based on the policy. For example, the metadata may be analyzed to determine censoring information. The censoring information is then used to censor the audio-video, such as a bounding box may be determined from the metadata and the bounding box is used to blur the audio-video.

Step 412 sends the censored audio-video to the destination endpoint 106. Step 414 determines if more destination endpoints require censoring. If so, the process reiterates to step 408. If not, the process reiterates to step 402 as audio-video is constantly processed for censoring.

To provide for increased security for a censoring policy, certain actions may be performed if the metadata stream is blocked, corrupt, or lost. For example, because the metadata stream is sent separately, there is a chance it may be lost. It may not be desirable to display uncensored audio-video if the metadata is lost. In one example, if a destination endpoint is set to receive face blurring and unscrambled audio, the audio-video to that specific destination endpoint may be dropped or the entire screen blurred with unscrambled audio if the metadata is dropped. For example, multi-point control unit 102 may provide the best experience for the conference without violating the censoring policy. In this case, instead of taking a chance of revealing a person's face, the entire audio-video may be blurred. This ensures that at least the censoring policy is adhered to.

In another embodiment, a confidence level along with a list of coordinates may be provided in the metadata. The confidence level may be generated by metadata determiner 202 (e.g., a face detection algorithm) and inserted into each packet with censoring coordinates. Multi-point control unit 102 may make policy-level decisions regarding how much censoring to perform based on this confidence level. For example, if two faces have been detected in a segment, and this number suddenly drops to one face detected, the confidence level may be dropped. Multi-point control unit 102 may have a threshold for waiting for the second participant to return to a position where their face can be accurately detected. If a time-out occurs, it is recognized that the participant has left the segment. If multi-point control unit 102 does not receive a confidence level above a configured amount, then the segment could be censored to a lowest allowable level for each destination endpoint 106. Also, a hand-shaking mechanism to guarantee receipt of the censoring information may be provided. For example, an acknowledgement may be sent after multi-point control unit 102 has received a metadata packet.

Figure 5:
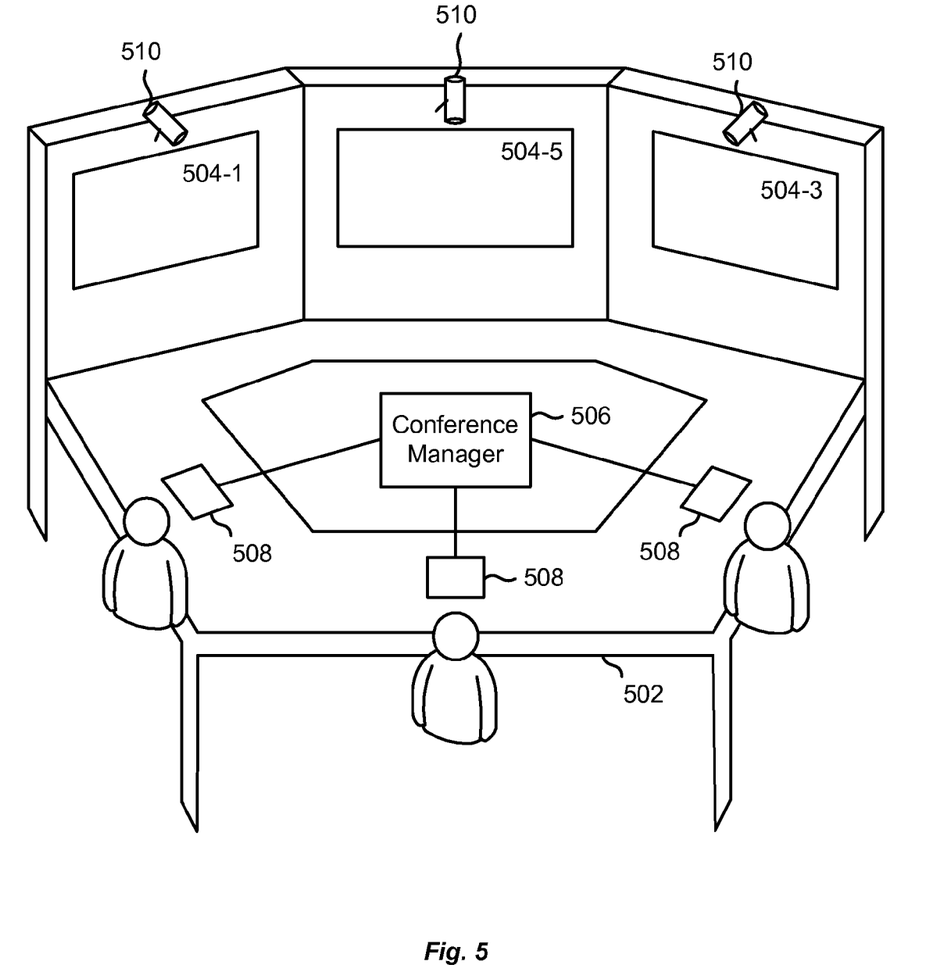
FIG. 5 depicts an example of a location that includes endpoint 104 or 106 according to one embodiment.

FIG. 5 depicts an example of a location that includes endpoint 104 or 106 according to one embodiment. Although a three screen display is shown, it will be understood that other configurations may be provided. For example, the arrangement and number of displays and users may be different.

Users may be participating in a conference and may be situated around conference table 502. During the conference, the users may engage in the session as speakers.

Display screens 504 include any devices that can display an image of one or more conference users at location 104. Examples of display screens 504 include a flat screen TVs, notebook PCs, monitors, etc. In one embodiment, display screens 504 may display three different segments. For example, video streams from three different locations may be displayed. The three video streams display different users from different locations. Although three display screens are described, it will be understood that any number of screens may be used. The screens may be virtual, such as a display device may have three windows displaying three locations.

In one embodiment, location may include a number of cameras 510 that capture video of the users. For example, three cameras 510 may capture video of three different areas. Although three cameras are described, it will be understood that any number of cameras 510 may be provided. The three cameras 510 generate three video streams that may be sent to a conference end point—conference manager 506. Conference manager 506 may then send the video streams to multi-point control unit 102. In addition to the video streams, audio may be captured for the users from microphones 508. For example, audio for the entire location may be captured by all three microphones 508. In accordance with an example embodiment, individual audio streams may be captured by placing microphones in the vicinity of each conference participants. In accordance with this embodiment, each one of the audio streams is associated with a video stream from the corresponding conference participant. Each location may have three video streams captured (i.e., segments) as well as three associated audio streams. Any of these segments may be displayed on display screens 504 in remote locations.

Accordingly, three audio-video streams may be captured and sent by conference manager 502. The location is configured to provide an enhanced conference experience. The bandwidth used to send the three audio-video streams may be large. Thus, sending multiple versions audio-video streams may use too much bandwidth to provide an effective conference. Thus, particular embodiments provide a method to provide a high quality conference while minimizing bandwidth used because only uncensored audio-video streams versions of the captured video streams are sent.

Particular embodiments may be useful for anybody who desires multiple levels of privacy or censoring and would like to do so with minimal bandwidth impact. Different applications may use particular embodiments. For example, in a judicial situation with witnesses or informants, retaining anonymity is very important. Also, military-intelligence may need identities to be secret. Also, anonymous tips for police to use allow for back and forth interaction. Other applications may include anonymous interactions for users while still retaining contacts of voice or body language while censoring the face, anonymous therapy, conference observation, or other applications may be provided.

Although the description has been described with respect to particular embodiments thereof, these particular embodiments are merely illustrative, and not restrictive. Although a conference is described, it will be understood that particular embodiments may be used in other applications, such as streaming video, Internet protocol television (IPTV), etc.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method comprising:
   receiving an audio-video stream from a source from a source;
   receiving metadata including censoring information for the audio-video stream;
   determining a first level of censoring for the audio-video stream using first censoring information, the first level associated with a first receiver;
   determining a second level of censoring for the audio-video stream, the second level associated with a second receiver;
   generating a first audio-video stream with a first censoring level for the first receiver based on the first censoring information;
   generating a second audio-video stream with a second censoring level for the second receiver based on the second censoring information; and
   sending the first audio-video stream to the first receiver and sending the second audio-video stream to the second receiver, the first audio-video stream with the first censoring level and the second audio-video stream with the second censoring level created from the audio-video stream received from the source.

2. The method of claim 1, wherein the first censoring level comprises censoring a portion of the audio-video stream.

3. The method of claim 2, wherein the second censoring level comprises not censoring the audio-video stream.

4. The method of claim 1, wherein the metadata comprises coordinate information associated with video of the audio video stream, wherein the coordinate information is used to censor the video of the audio-video stream at coordinates associated with the coordinate information.

5. The method of claim 1, wherein the metadata is received in a separate stream from the audio-video stream.

6. The method of claim 1, wherein the metadata includes a timestamp indicating when censoring information should be applied to the audio-video stream.

7. The method of claim 1, further comprising:
   determining that an error or failure occurred with the metadata; and
   censoring the first and/or second audio-video stream with a highest level of censoring based on a policy for the first and/or second receiver.

8. The method of claim 1, wherein the audio-video stream received from the source is a single stream for a segment in which video and/or audio is captured, wherein the first and second audio-video stream are created from the audio-video stream received from the source.

9. The method of claim 1, further comprising:
   decoding the audio-video stream received from the receiver;
   applying censoring to the first audio-video stream using the censoring information;
   applying censoring to the second audio-video stream using the censoring information; and
   encoding the first and second audio-video stream.

10. The method of claim 1, further comprising:
    receiving a confidence level for the censoring information; and
    adjusting the censoring applied to the first and/or second audio-video stream based on the confidence level.

11. An apparatus comprising:
    one or more processors; and
    logic encoded in one or more tangible media for execution by the one or more processors and when executed operable to:
    receive an audio-video stream from a source from a source;
    receive metadata including censoring information for the audio-video stream;
    determine a first level of censoring for the audio-video stream using first censoring information, the first level associated with a first receiver;
    determine a second level of censoring for the audio-video stream, the second level associated with a second receiver;
    generate a first audio-video stream with a first censoring level for the first receiver based on the first censoring information;
    generate a second audio-video stream with a second censoring level for the second receiver based on the second censoring information; and
    send the first audio-video stream to the first receiver and sending the second audio-video stream to the second receiver, the first audio-video stream with the first censoring level and the second audio-video stream with the second censoring level created from the audio-video stream received from the source.

12. The apparatus of claim 11, wherein the first censoring level comprises censoring a portion of the audio-video stream.

13. The apparatus of claim 12, wherein the second censoring level comprises not censoring the audio-video stream.

14. The apparatus of claim 11, wherein the metadata comprises coordinate information associated with video of the audio video stream, wherein the coordinate information is used to censor the video of the audio-video stream at coordinates associated with the coordinate information.

15. The apparatus of claim 11, wherein the metadata is received in a separate stream from the audio-video stream.

16. The apparatus of claim 11, wherein the metadata includes a timestamp indicating when censoring information should be applied to the audio-video stream.

17. The apparatus of claim 11, wherein the logic when executed is further operable to:
   determine that an error or failure occurred with the metadata; and
   censor the first and/or second audio-video stream with a highest level of censoring based on a policy for the first and/or second receiver.

18. The apparatus of claim 11, wherein the audio-video stream received from the source is a single stream for a segment in which video and/or audio is captured, wherein the first and second audio-video stream are created from the audio-video stream received from the source.

19. The apparatus of claim 11, wherein the logic when executed is further operable to:
   decode the audio-video stream received from the receiver;
   apply censoring to the first audio-video stream using the censoring information;
   apply censoring to the second audio-video stream using the censoring information; and
   encode the first and second audio-video stream.

20. An apparatus comprising:
   means for receiving an audio-video stream from a source from a source;
   means for receiving metadata including censoring information for the audio-video stream;
   means for determining a first level of censoring for the audio-video stream using first censoring information, the first level associated with a first receiver;
   means for determining a second level of censoring for the audio-video stream, the second level associated with a second receiver;
   means for generating a first audio-video stream with a first censoring level for the first receiver based on the first censoring information;
   means for generating a second audio-video stream with a second censoring level for the second receiver based on the second censoring information; and
   means for sending the first audio-video stream to the first receiver and sending the second audio-video stream to the second receiver, the first audio-video stream with the first censoring level and the second audio-video stream with the second censoring level created from the audio-video stream received from the source.

* * * * *